US011898225B2

(12) United States Patent
Charbon et al.

(10) Patent No.: US 11,898,225 B2
(45) **Date of Patent: *Feb. 13, 2024**

(54) SPIRAL SPRING FOR A HOROLOGICAL MOVEMENT

(71) Applicant: Nivarox-FAR S.A., Le Locle (CH)

(72) Inventors: Christian Charbon, Chézard-St-Martin (CH); Lionel Michelet, Fleurier (CH); Marco Verardo, Les Bois (CH)

(73) Assignee: Nivarox-FAR S.A., Le Locle (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,870

(22) Filed: Mar. 15, 2022

(65) Prior Publication Data

US 2022/0298610 A1 Sep. 22, 2022

(30) Foreign Application Priority Data

Mar. 16, 2021 (EP) .................................... 21162933

(51) Int. Cl.
*C22C 27/02* (2006.01)
*G04B 17/06* (2006.01)

(52) U.S. Cl.
CPC ............ *C22C 27/02* (2013.01); *G04B 17/066* (2013.01)

(58) Field of Classification Search
None
See application file for complete search history.

(56) References Cited

U.S. PATENT DOCUMENTS

| | | | | |
|---|---|---|---|---|
| 5,881,026 | A | 3/1999 | Baur et al. | |
| 2007/0133355 | A1 * | 6/2007 | Hara | G04B 1/145 368/140 |
| 2019/0196405 | A1 | 6/2019 | Charbon | |
| 2019/0196406 | A1 | 6/2019 | Charbon | |
| 2020/0308685 | A1 * | 10/2020 | Laheurte | C22C 14/00 |
| 2020/0356057 | A1 | 11/2020 | Charbon | |
| 2022/0298611 | A1 * | 9/2022 | Charbon | G04B 17/066 |

FOREIGN PATENT DOCUMENTS

| | | | |
|---|---|---|---|
| EP | 0 886 195 | A1 | 12/1998 |
| EP | 3 502 288 | A1 | 6/2019 |
| EP | 3 502 785 | A1 | 6/2019 |
| EP | 3 736 639 | A1 | 11/2020 |
| JP | 11-71625 | A | 3/1999 |
| JP | 2019-113544 | A | 7/2019 |
| JP | 2020-515720 | A | 5/2020 |
| JP | 2020-183940 | A | 11/2020 |
| RU | 2 696 327 | C1 | 8/2019 |
| RU | 2018 122 930 | A | 12/2019 |
| WO | WO 2018/172164 | A1 | 9/2018 |

OTHER PUBLICATIONS

European Search Report dated Aug. 3, 2021 in European Application 21162933.2, filed on Mar. 16, 2021, 3 pages (with English Translation of Categories of cited documents).
Combined Russian Office Action and Search Report dated Nov. 17, 2022 in Russian Patent Application No. 2022106674 (with unedited computer generated English Translation), 17 pages.
Office Action dated Jan. 31, 2023, in corresponding Japanese Patent Application No. 2022-036788 (with English Translation), 15 pages.
Final Decision of Rejection dated Jun. 13, 2023 in Japanese Patent Application No. 2022-036788 (with English language translation), 8 pages.

* cited by examiner

*Primary Examiner* — Brian D Walck
(74) *Attorney, Agent, or Firm* — Oblon, McClelland, Maier & Neustadt, L.L.P.

(57) ABSTRACT

A spiral spring intended to equip a balance of a horological movement, wherein the spiral spring is made of an alloy consisting of Nb, Ti and at least one element selected from Zr and Hf, optionally at least one element selected from W and Mo, possible traces of other elements selected from O, H, Ta, C, Fe, N, Ni, Si, Cu, Al, with the following weight percentages: a content of Nb comprised between 40 and 84%, a total content of Ti, Zr and Hf comprised between 16 and 55%, a content for W and Mo respectively comprised between 0 and 2.5%, a content for each of said elements selected from O, H, Ta, C, Fe, N, Ni, Si, Cu, Al comprised between 0 and 1600 ppm with the sum of said traces less than or equal to 0.3% by weight. The method for manufacturing the spiral spring is also disclosed.

17 Claims, No Drawings

SPIRAL SPRING FOR A HOROLOGICAL MOVEMENT

CROSS-REFERENCE TO RELATED APPLICATION

This application claims priority to European Patent Application No. 21162933.2 filed on Mar. 16, 2021, the entire disclosure of which is hereby incorporated herein by reference.

FIELD OF THE INVENTION

The invention relates to a spiral spring intended to equip a balance of a horological movement. It also relates to the manufacturing method of this spiral spring.

BACKGROUND OF THE INVENTION

The manufacture of spiral springs for watchmaking must face constraints that are often incompatible at first sight:

need to obtain a high elastic limit, ease of production, in particular drawing and rolling, excellent fatigue resistance, stable performance over time, small sections.

The alloy selected for a spiral spring must also have properties guaranteeing the maintenance of chronometric performance despite the variation in the temperatures of use of a watch incorporating such a spiral spring. The thermoselastic coefficient, also called TEC of the alloy, is then of great significance. To form a chronometric oscillator with a CuBe or nickel silver balance, a TEC of +/−10 ppm/° C. must be achieved. The formula that links the TEC of the alloy and the expansion coefficients of the spiral (α) and the balance (β) is as follows:

$$TC = \frac{dM}{dT} = \left(\frac{1}{2E}\frac{dE}{dT} - \beta + \frac{3}{2}\alpha\right) \times 86400 \frac{s}{j\ ^\circ\ C.}$$

the variables M and T being respectively the rate in s/d and the temperature in ° C., E being the Young's modulus of the spiral spring with (1/E. dE/dT) which is the TEC of the spiral alloy, the expansion coefficients being expressed in $^\circ\ C^{-1}$.

Practically, the TC is calculated as follows between 8° C. and 38° C.:

$$TC = \frac{(M_{38^\circ\ C.} - M_{8^\circ\ C.})}{30}$$

with a value which must be comprised between -0.6 and +0.6 s/d° C.

Spiral springs for watchmaking are known from the prior art which are made of binary Nb-Ti alloys with percentages of Ti typically comprised between 40 and 60% by weight and more specifically with a percentage of Ti of 47%. With an adapted deformation and heat treatment diagram, this spiral spring has a two-phase microstructure including niobium in the beta phase and titanium in the form of precipitates in the alpha phase. The cold-worked alloy in the beta phase has a strongly positive TEC and the precipitation of the alpha phase which has a strongly negative TEC allows the two-phase alloy to be brought to a TEC close to zero, which is particularly favourable for the TC.

However, there are some disadvantages when using Nb-Ti binary alloys for spiral springs.

A disadvantage of binary Nb-Ti alloys is related to the precipitation of titanium which takes place mainly after the winding step during the fixing step. In practice, precipitation times are very long with, for an NbTi47 alloy, times comprised between 8 and 30 hours and on average around 20 hours, which significantly increases production times.

Apart from the problem of high production times, too high percentage of titanium can lead to the formation of fragile martensitic phases which make it difficult, if not impossible, to deform the material, which is therefore not suitable for the production of a spiral spring. It is therefore advisable not to incorporate too much titanium into the alloy.

To date, there is still a need to develop new chemical compositions fulfilling the various criteria of absence of fragile phases and reduction of production times for the producing spiral springs.

SUMMARY OF THE INVENTION

The object of the invention is to propose a new chemical composition of a spiral spring allowing to overcome the aforementioned disadvantages.

To this end, the invention relates to a watch spiral spring made from an at least ternary alloy with a base of niobium and titanium. According to the invention, Ti is partly replaced by Zr and/or Hf which are also able to form alpha phase precipitates. The partial replacement of Ti by Zr and/or Hf allows to accelerate precipitation during fixing and therefore to reduce production times.

More specifically, the present invention relates to a spiral spring intended to equip a balance of a horological movement, said spiral spring being made from an at least ternary alloy consisting of:

Nb, Ti and at least one element selected from Zr and Hf, optionally at least one element selected from W and Mo, possible traces of other elements selected from O, H, C, Ta, Fe, N, Ni, Si, Cu, Al, with the following percentages by weight:

a content of Nb comprised between 40 and 84%, a total content of Ti, Zr and Hf comprised between 16 and 55% with preferably a minimum content of Ti of 15%, a content for W and Mo respectively comprised between 0 and 2.5%, a content for each of said elements selected from O, H, C, Ta, Fe, N, Ni, Si, Cu, Al comprised between 0 and 1600 ppm with the sum of said traces less than or equal to 0.3% by weight.

The invention also relates to the method for manufacturing this watch spiral spring comprising successively:

a step of production or provision of a blank made of an at least ternary alloy consisting of:

Nb, Ti and at least one element selected from Zr and Hf, optionally at least one element selected from W and Mo, possible traces of other elements selected from O, H, Ta, C, Fe, N, Ni, Si, Cu, Al, with the following weight percentages:

a content of Nb comprised between 40 and 84%, a total content of Ti, Zr and Hf comprised between 16 and 55% with preferably a minimum content of Ti of 15%, a content for W and Mo respectively comprised between 0 and 2.5%, a content for each of said elements selected from O, H, Ta, C, Fe, N, Ni, Si, Cu, Al comprised between 0 and 1600 ppm with the sum of said traces less than or equal to 0.3% by weight, a step of beta type quenching of said blank, so that titanium of said alloy is essentially in the form of a solid solution with niobium in the beta phase, zirconium and/or hafnium also being essentially in the form of a solid solution, a step of application to said alloy of a succession of deformation sequences followed by an intermediate heat treatment, a winding step to form the spiral spring, a final heat treatment step also called fixing.

Advantageously, the final heat treatment step to finalise the precipitation of titanium and zirconium and/or hafnium is carried out in a time comprised between 4 and 8 hours at a holding temperature comprised between 400° C. and 600° C.

In addition to reducing the fixing time, the partial replacement of titanium by zirconium allows to reduce the secondary error as explained below.

DETAILED DESCRIPTION

The invention relates to a watch spiral spring made of an at least ternary alloy including niobium and titanium and one or more additional elements.

According to the invention, this alloy consists of:

Nb, Ti and at least one element selected from Zr and Hf, optionally at least one element selected from W and Mo, possible traces of other elements selected from O, H, C, Ta, Fe, N, Ni, Si, Cu, Al, with the following weight percentages:

- a content of Nb comprised between 40 and 84%,
- a total content of Ti, Zr and Hf comprised between 16 and 55%,
- a content for W and Mo respectively comprised between 0 and 2.5%,
- a content for each of said elements selected from O, H, C, Ta, Fe, N, Ni, Si, Cu, Al comprised between 0 and 1600 ppm with the sum of said traces less than or equal to 0.3% by weight.

Preferably, the content by weight of Nb is greater than 45%, or even greater than or equal to 50%, in order to obtain a sufficient percentage of beta phase having a strongly positive TEC intended to be compensated by the negative TEC of the alpha phase of Ti, Zr, Hf.

Preferably, the content by weight of Ti is maintained at a minimum content of 15% because Ti is more economical than Zr and Hf. Furthermore, it has the advantage of having a lower melting temperature than Zr and Hf, which facilitates casting.

The percentage by weight of oxygen is less than or equal to 0.10% of the total, or even less than or equal to 0.085% of the total.

The percentage by weight of hydrogen is less than or equal to 0.01% of the total, in particular less than or equal to 0.0035% of the total, or even less than or equal to 0.0005% of the total.

The percentage by weight of carbon is less than or equal to 0.04% of the total, in particular less than or equal to 0.020% of the total, or even less than or equal to 0.0175% of the total.

The percentage by weight of tantalum is less than or equal to 0.10% by weight of the total.

The percentage by weight of iron is less than or equal to 0.03% of the total, in particular less than or equal to 0.025% of the total, or even less than or equal to 0.020% of the total.

The percentage by weight of nitrogen is less than or equal to 0.02% of the total, in particular less than or equal to 0.015% of the total, or even less than or equal to 0.0075% of the total.

The percentage by weight of nickel is less than or equal to 0.01% of the total.

The percentage by weight of silicon is less than or equal to 0.01% of the total.

The percentage by weight of copper is less than or equal to 0.01% of the total, in particular less than or equal to 0.005% of the total.

The percentage by weight of aluminium is less than or equal to 0.01% of the total.

According to the invention, Ti is partly replaced by Zr and/or Hf forming, like Ti, alpha precipitates, so as to accelerate the precipitation during the fixing and therefore to reduce the production times. Advantageously, the sum of the Zr and Hf content is comprised between 1 and 40% by weight. Preferably, the sum of the Zr and Hf content is comprised between 5 and 25%, more preferably between 10 and 25% and even more preferably between 15 and 25% by weight.

Advantageously, Ti is at least replaced by Zr which also allows to reduce the secondary error which is a measurement of the curvature of the rate which is generally approximated by a straight line passing through two points (8° C. and 38° C.). Tests were carried out on binary alloys Nb-Ti with a weight percentage of Ti of 47% (NbTi47) and Nb-Zr with weight percentages of Zr comprised between 0 and 70% to show the effect of Ti and Zr respectively on the secondary error. The secondary error is measured at 23° C. This is the difference in rate at 23° C. relative to the straight line linking the rate at 8° C. to that at 38° C. For example, the rate at 8° C., 23° C. and 38° C. can be measured using a Witschi chronoscope-type apparatus.

Table 1 below shows the data for pure Nb, the NbTi47 alloy and the Nb-Zr alloy as a function of the percentage by weight of Zr. Pure Nb has a secondary error at 23° C. of -6.6 s/d. The precipitation of Ti in the NbTi47 alloy compensates for the negative effect of Nb with however an excessive rise with a positive value reaching 4.5 s/d. Nb-Zr alloys, on the other hand, have a negative secondary error for a Zr content greater than 0%, or even zero for Zr contents greater than or equal to 45% by weight. It follows that the partial replacement of Ti by Zr in a ternary alloy allows to compensate for the too positive effect of Ti on the secondary error. Adding a few percent by weight of Zr already allows to reduce the secondary error to a value closer to 0 than for the binary NbTi47 alloy. Thus, advantageously, the Zr content is at least 5% by weight.

TABLE 1

| Alloy | % wt | Secondary error at 23° C. |
|---|---|---|
| Pure Niobium | 0% | −6.6 s/d |
| NbTi47 | 47% | 4.5 s/d |
| $Nb_{30}Zr_{70}$ | 70% | −0.2 s/d |
| $Nb_{45}Zr_{55}$ | 55% | 0.0 s/d |
| $Nb_{50}Zr_{50}$ | 50% | 0.2 s/d |
| $Nb_{55}Zr_{45}$ | 45% | 0.0 s/d |
| $Nb_{60}Zr_{40}$ | 40% | −3.0 s/d |
| $Nb_{65}Zr_{35}$ | 35% | −4.1 s/d |
| $Nb_{70}Zr_{30}$ | 30% | −4.8 s/d |
| $Nb_{80}Zr_{20}$ | 20% | −5.0 s/d |

TABLE 1-continued

| Alloy | % wt | Secondary error at 23° C. |
|---|---|---|
| $Nb_{85}Zr_{15}$ | 15% | −5.8 s/d |
| $Nb_{90}Zr_{10}$ | 10% | −6.0 s/d |
| $Nb_{100}$ | 0% | −6.6 s/d |

The alloy may further include W and Mo in a content by weight for each comprised between 0 and 2.5% in order to increase the Young's modulus of the alloy, which allows for a given torque of the spring to reduce the thickness of the spiral and thereby lighten the spiral.

Advantageously, the spiral spring according to the invention has a multiphase microstructure including niobium in centred cubic beta phase, and a single alpha phase of titanium and zirconium and/or hafnium.

To obtain such a microstructure, it is necessary to finalise the precipitation in the alpha phase by heat treatment during the fixing of the spring in the manufacturing method successively implementing the following steps:

- a step of provision or production of a blank. For example, the blank can be made by melting the elements in an electric arc or electron gun furnace to form a billet or ingot which is hot forged then cold deformed and heat treated between the deformation phases. The blank is made of an at least ternary alloy consisting of:
- Nb, Ti and at least one element selected from Zr and Hf,
- optionally at least one element selected from W and Mo,
- possible traces of other elements selected from O, H, Ta, C, Fe, N, Ni, Si, Cu, Al, with the following weight percentages:
  - a content of Nb comprised between 40 and 84%,
  - a total content of Ti, Zr and Hf comprised between 16 and 55%,
  - a content for W and Mo respectively comprised between 0 and 2.5%,
  - a content for each of said elements selected from O, H, Ta, C, Fe, N, Ni, Si, Cu, Al comprised between 0 and 1600 ppm with the sum of said traces less than or equal to 0.3% by weight,
- a step of beta type quenching of said blank, so that titanium of said alloy is essentially in the form of a solid solution with niobium in the beta phase, zirconium and/or hafnium also being essentially in the form of a solid solution,
- a step of application to said alloy of a succession of deformation sequences followed by an intermediate heat treatment. Deformation means a deformation by drawing and/or rolling. Drawing may require the use of one or more dies during the same sequence or during different sequences if necessary. Drawing is carried out until a wire with a round section is obtained. Rolling can be done in the same deformation sequence as drawing or in another sequence. Advantageously, the last sequence applied to the alloy is a rolling preferably with a rectangular profile compatible with the entry section of a winding pin.
- a winding step to form the spiral spring,
- a final heat treatment step.

In these coupled deformation-heat treatment sequences, each deformation is carried out with a given deformation amount comprised between 1 and 5, this deformation amount corresponding to the conventional formula 21n(d0/d), wherein d0 is the diameter of the last beta quenching, and where d is the diameter of the cold-worked wire. The global accumulation of the deformations on the whole of this succession of sequences brings a total deformation amount comprised between 1 and 14.

Each coupled deformation-heat treatment sequence includes, each time, a heat treatment of precipitation of the Ti, Zr and/or Hf alpha phase.

The beta quenching prior to the deformation and heat treatment sequences is a dissolution treatment, with a duration comprised between 5 minutes and 2 hours at a temperature comprised between 700° C. and 1000° C., under vacuum, followed by cooling under gas.

Even more particularly, this beta quenching is a dissolution treatment, lasting 1 hour at 800° C. under vacuum, followed by cooling under gas.

To return to the coupled deformation-heat treatment sequences, the heat treatment is a precipitation treatment with a duration comprised between 1 hour and 200 hours at a temperature comprised between 300° C. and 700° C. More particularly, the duration is comprised between 3 hours and 30 hours at a temperature comprised between 400° C. and 600° C.

More particularly, the method includes between one and five coupled deformation-heat treatment sequences.

More particularly, the first coupled deformation-heat treatment sequence includes a first deformation with at least 30% reduction in section.

More particularly, each coupled deformation-heat treatment sequence, other than the first, includes one deformation between two heat treatments with at least 25% reduction in section.

More particularly, after this production of said alloy blank, and before the deformation-heat treatment sequences, in an additional step, a surface layer of ductile material taken from copper, nickel, cupro-nickel, cupro-manganese, gold, silver, nickel-phosphorus Ni-P and nickel-boron Ni-B, or the like is added to the blank to facilitate shaping into a wire shape during deformation. And, after the deformation-heat treatment sequences or after the winding step, the wire is stripped of its layer of ductile material, in particular by chemical attack.

Alternatively, the surface layer of ductile material is deposited so as to form a spiral spring whose pitch is not a multiple of the thickness of the blade. In another variant, the surface layer of ductile material is deposited so as to form a spring whose pitch is variable.

In a particular horological application, ductile material or copper is thus added at a given moment to facilitate shaping into a wire shape, so that a thickness of 10 to 500 micrometres remains on the wire with the final diameter of 0.3 to 1 millimetres. The wire is stripped of its layer of ductile material or copper in particular by chemical attack, then is rolled flat before the manufacture of the actual spring by winding.

The supply of ductile material or copper can be galvanic, or else mechanical, it is then a jacket or a tube of ductile material or copper which is adjusted on a bar of the alloy with a large diameter, then which is thinned during the steps of deformation of the composite rod.

The removal of the layer is in particular possible by chemical attack, with a solution based on cyanides or based on acids, for example nitric acid.

The final heat treatment is carried out for a duration comprised between 1 hour and 200 hours at a temperature comprised between 300° C. and 700° C. More particularly, the duration is comprised between 3 hours and 30 hours at a temperature comprised between 400° C. and 600° C. Advantageously, the duration is comprised between 4 and 8 hours with a hold at a temperature comprised between 400°

C. and 600° C. During this final heat treatment, the precipitation of titanium as well as hafnium and/or zirconium in the alpha phase is finalised.

By a suitable combination of sequences of deformation and heat treatment, it is possible to obtain a very fine microstructure, which is in particular nanometric, including beta niobium and an alpha phase of titanium and hafnium and/or zirconium. This alloy combines a very high elastic limit, greater than at least 500 MPa and a modulus of elasticity greater than or equal to 100 GPa and preferably greater than or equal to 110 GPa. This combination of properties is well suited for a spiral spring. Furthermore, this at least ternary niobium-titanium-hafnium and/or zirconium alloy according to the invention can easily be covered with ductile material or copper, which greatly facilitates its deformation by drawing.

This alloy also has an effect similar to that of "Elinvar", with a practically zero thermo-elastic coefficient in the range of temperatures commonly used in watches, and adapted for the manufacture of self-compensating spirals.

The invention claimed is:

1. A spiral spring configured to equip a balance of a horological movement, wherein the spiral spring is made of an alloy consisting of:

Nb in a range of from 40 to 84 wt. %;

Ti in at least 15 wt. %; and

Zr and/or Hf;

optionally, W;

optionally, Mo; and optionally, O, H, Ta, C, Fe, N, Ni, Si, Cu, and/or Al, wherein a total content of the Ti, Zr, and Hf is in a range of from 16 to 55 wt. %, wherein a W content is in a range of from 0 to 2.5 wt. %, wherein a Mo content is in a range of from 0 to 2.5 wt %, wherein a content for each of the O, H, Ta, C. Fe, N, Ni, Si, Cu, and Al is in a range of from 0 to 1600 ppm, wherein sum of the O, H, Ta, C, Fe, N, Ni, Si, Cu, and Al is less than or equal to 0.3 wt. %, and wherein the spiral spring has a modulus of elasticity of at least 110 GPa.

2. The spiral spring of claim 1, wherein the Nb content is greater than 45 wt. %.

3. The spiral spring according to claim 1, wherein the Ti content is greater than or equal to 15 wt. %.

4. The spiral spring of claim 1, wherein a sum of the Zr and the Hf is in a range of from 1 to 40 wt. %.

5. The spiral spring of claim 1, wherein a sum of the Zr and the Hf is in a range of from 1 to 25 wt. %.

6. The spiral spring of claim 1, wherein a sum of the Zr and the Hf is in a range of from 10 to 25 wt. %.

7. The spiral spring of claim 1, wherein a sum of the Zr and the Hf is in a range of from 15 to 25 wt. %.

8. The spiral spring of claim 1, wherein the Zr is present at least 5 wt. %.

9. The spiral spring of claim 1, wherein the Zr and the Hf are present.

10. The spiral spring of claim 1, having a microstructure comprising

Nb in the beta phase, and

Ti as well as Zr and/or Hf in the alpha phase.

11. The spiral spring of claim 1, having elastic limit greater than or equal to 500 MPa.

12. A method for manufacturing the spiral spring of claim 1, the method successively comprises:

beta type quenching of a blank of the alloy, which is at least ternary, so that titanium of the alloy of essentially a solid solution with niobium in beta phase, zirconium and/or hafnium also being essentially in the solution solid;

applying to the alloy a succession of deformation sequences followed by an intermediate heat treatment;

winding the allow to form the spiral spring; and applying a final heat treatment.

13. The method of claim 12, wherein the beta type quenching is a dissolution treatment, with a duration in a range of from 5 minutes to 2 hours at a temperature in a range of from 700° C. to 1000° C., under vacuum, followed by cooling under gas.

14. The method of claim 12, wherein the beta type quenching is a dissolution treatment lasting 1 hour at 800° C. under vacuum, followed by cooling under gas.

15. The method of claim 12, wherein the final heat treatment and the intermediate heat treatment of each sequence is a precipitation treatment of (i) Ti and of (ii-a) Zr and/or (ii-b) Hf in the alpha phase with a duration in a range of from 1 hour and 200 hours at a holding temperature in a range of from 300° C. to 700° C.

16. The method of claim 12, wherein the final heat treatment is carried out at a holding temperature in a range of from 400° C. to 600° C. for a duration in a range of from 4 and 8 hours.

17. The method of claim 12, wherein, before the applying of the succession of sequences, a surface layer of ductile material comprising copper, nickel, cupro-nickel, cupro-manganese, gold, silver, nickel-phosphorus Ni-P, and/or nickel-boron Ni-B, is added to the blank to facilitate shaping into a wire, and wherein, before or after the winding step, the wire is chemically stripped of the surface layer of ductile material.

* * * * *